United States Patent Office 3,560,225
Patented Feb. 2, 1971

3,560,225
EMULSIFIER COMPOSITION FOR
CONFECTIONERY PRODUCTS
Bronislaw R. Wonsiewicz, Naperville, Fred R. Paulicka, Chicago, and William E. Wester, Orland Park, Ill., assignors to SCM Corporation, New York, N.Y.
No Drawing. Filed Dec. 16, 1966, Ser. No. 602,174
Int. Cl. A23g 3/00
U.S. Cl. 99—118                    3 Claims

ABSTRACT OF THE DISCLOSURE

Emulsifier ester compositions comprising a phospholipid, a partial ester of polyatomic alocohol and a saturated aliphatic fatty acid and (optionally) a mixture of partial esters of glycerol and saturated aliphatic fatty acid have been prepared. Confectionery hard butter compositions comprising a hard butter having the emulsifier composition dispersed therein and high surface gloss confectionery formulations containing the hard butter compositions have also been prepared. Improved processes for enhancing and maintaining the surface gloss of confectionery formulations are described.

The present invention is concerned with novel edible compositions useful in confectionery products. The invention is more particularly concerned with emulsifier ester compositions, hard butter compositions containing the emulsifier ester compositions and with confectionery products having enhanced surface gloss. The invention is also concerned with an improved process for providing and maintaining high surface gloss in confections and confectionery products.

The invention is advantageous in that it provides confectionery products having a higher surface gloss than that generally heretofore obtainable and gloss which is maintained during storage of the products. The invention is further advantageous in that it eliminates the necessity of tempering hard butter-containing confections (tempering being conventionally employed to improve the surface gloss of such confectionery products) and in that it prevents loss of surface gloss in the confectionery products during storage.

The term "emulsifier ester compositions" as used herein is intended to mean and to refer to compositions comprising a phosphorus ester of a glyceride (i.e. a phospholipid), a partial ester of a polyatomic alcohol and saturated aliphatic acid and (optionally) a mixture of partial esters of glycerol and saturated aliphatic fatty acid.

The term "hard butter composition" or "glyceride composition" as used herein is intended to mean and to refer to hard butters containing from about 5 to about 15 weight percent of the emulsifier ester composition.

The terms "confectionery formulation," "confectionery product," or "confectionery coating composition" as used herein are intended to mean and to refer to confectionery compositions comprising a sugar and a hard butter composition and which usually contain an emulsifier.

In its broadest aspect, the invention provides an emulsifier ester composition comprising (a) an edible phospholipid and (b) a patrial ester of a polyatomic alcohol containing from 4 to 12 carbon atoms and a saturated aliphatic fatty acid containing from 12 to 26 carbon atoms. Such ester compositions can be readily dispersed in hard butters in from between about 5 and 15 percent, basis the weight of the hard butter, and provide hard butter compositions which, when employed in confectionery formulations, provide products having a high surface gloss which is maintained during storage of the product for prolonged periods of time (e.g. up to 3 months or longer).

The edible phospholipid employed in the emulsifier ester compositions falling within the scope of this invention may be of plant or animal origin but are preferably of plant origin for economic reasons. Generally, phospholipids are glycerol esters in which 2 of the hydroxyl groups of the glycerol are esterified with acyl groups, usually fatty acids. The third hydroxyl group of the glycerol is esterified with a phosphorus-containing ester group in which one of the hydroxyl groups of phosphoric acid is esterified (with the above-mentioned third hydroxyl group of the glycerol) and another of the hydroxyl groups of the phosphoric acid is esterified with an amino compound usually an alkyl, an alkenyl or an alkanol amine. Examples of suitable edible phospholipids include alpha-lecithin, beta-lecithin, cephalin and the sphingomyelins. Of these the lecithins have been found to be particularly advantageous and are preferred due to their low cost and ready availability.

The amount of edible phospholipid may vary considerably but is desirably between about 15 to about 50 percent, basis the weight of the emulsifier ester composition. If less than about 15 percent is employed, the emulsifier ester composition will not provide enhanced gloss when incorporated in hard butter-containing confections. Although more than about 50 weight percent of edible phospholipid may sometimes be employed, there is usually no advantage and there is some danger that the surfaces of the hard butter confections made from such compositions will be tacky.

The partial ester of a polyatomic alcohol and a saturated aliphatic fatty acid which is employed in the compositions of this invention is the reaction product of a polyatomic alcohol (e.g. a tetritol, a pentitol, a hexitol, or a heptitol (etc.) and at least one aliphatic fatty acid containing from 12 to 26 carbon atoms. Examples of polyatomic alcohols which form the reaction product of these esters include erythritol, arabitol, sorbitol, mannitol, dulcitol and the like.

Saturated fatty acids which form the esters are those having the empirical formula $C_nH_{(2n+1)}COOH$ and include lauric, tridecanoic, myristic, pentadecanoic, palmitic, margaric, stearic, nondecylic, arachidic, behenic, carnaubic, hyenic and carboceric acids. Preferred esters are lauric, myristic, palmitic, stearic and behenic acid esters and of these, palmitic and stearic are particularly preferred because of their availability. These fatty acids are usually obtained from natural sources such as triglyceride fats of plant and animal origin and usually occur in the fats as mixtures of glycerol esters of, predominantly, stearic and palmitic acids.

As previously noted, the esters of polyatomic alcohols and fatty acids are partial esters, that is to say, only some of the hydroxyl groups of the polyatomic alcohols are esterified (e.g. acylated) with the fatty acids. Advantageous partial esters are the mono- and di-esters of erythritol, arabitol, sorbitol, mannitol and dulcitol, the mono- and di-esters of sorbitol and mannitol being preferred for economic reasons. Preferred esters falling within this class are sorbitol-mono-stearate, sorbitol-di-stearate, sorbitol-mono-palmitate, sorbitol-di-palmitate and sorbitol-palmitostearate or mixtures of these esters. As will be evident hereinafter from the specific examples and co-pending U.S. patent appplication Ser. No. 602,166, filed simultaneously with the present application and assigned to the same assignee as the present application, particularly preferred esters of polyatomic alcohols and saturated fatty acids are internal esters, that is, the acyl groups are positioned on internal carbon atoms and are not on the primary carbon atoms. In the instance of sorbitol or mannitol esters, the acyl groups are usually at the 3 and/or 4 carbon atom position within the carbon atom chain.

Although external esters (e.g. esters in which the fatty acid groups are positioned at the primary carbon atoms) of polyatomic alcohols and fatty acids can also be used in emulsifier ester compositions falling within the scope of the invention, such esters usually contain undesirable products which are residues arising out of the processes from which the esters are prepared. These residues include dimethyl formamide and dimethyl sulfoxide and decomposition products of these solvents which often render such esters unsuitable for use in edible products. Specifically preferred esters are sorbitol-3-mono-stearate, sorbitol-3,4-di-stearate, sorbitol-3-mono-palmitate, sorbitol-3,4-di-palmitate and sorbitol-3-palmito-4-stearate and mixtures thereof.

The amount of esters of polyatomic alcohols and saturated fatty acids employed in the emulsifier ester compositions of this invention may vary considerably, depending upon whether the composition contains partial glycerol esters and upon a number of hereinafter defined factors and can vary from 5 up to 85 weight percent of the composition. If less than 5 weight percent of these esters are employed, confectionery products employing the coatings will usually not have the high surface gloss properties desired.

In another aspect of this invention, the emulsifier ester compositions comprise from about 15 to 50 weight parts of an (a) edible phospholipid, (b) from 0 to 65 weight parts of a hereinafter defined mixture of partial esters of glycerol and saturated aliphatic fatty acids containing from 12 to 26 carbon atoms, and (c) from about 5 to about 85 weight parts of a partial ester of a polyatomic alcohol and a saturated aliphatic fatty acid of the kind hereinbefore described.

The partial esters of glycerol and saturated aliphatic fatty acids containing from 12 to 26 carbon atoms are optional in the emulsifier ester compositions of this invention. Their use in certain instances contributes to the maintenance of high surface gloss during storage of confectionery products containing these emulsifier ester compositions. When used, the partial glycerol esters replace a portion of the phospholipid and/or a portion of the partial esters of polyatomic alcohols and saturated aliphatic fatty acids.

Partial glycerol ester products are well-known and are glycerolysis reaction products of triglycerides and glycerol. They are prepared by reacting triglycerides and glycerol in the presence of an interesterification catalyst such as an alkali metal alkoxide (e.g. sodium methoxide). These partial glycerol ester products can vary widely in composition and are usually mixtures of mono-glycerides, di-glycerides, unreacted triglycerides and glycerol and free fatty acids. A typical glyceride composition of the partial glycerol esters consists of from 5 to 15 molecular proportions of triglyceride, from 40 to 60 molecular proportions of diglyceride, and from 40 to 60 molecular proportions of mono-glyceride and minor amounts, usually less than one molecular proportion, of glycerol and free fatty acid.

The fatty acid portion of the partial glycerol esters can be any of the fatty acids hereinbefore described in connection with the fatty acids of the polyatomic alcohol esters. Generally, the fatty acid components will depend upon the source of the triglyceride employed in the preparation of the partial glycerol esters. The triglycerides can be of plant or animal origin and are usually mixtures of lauric, myristic, palmitic and stearic fatty acid groups esterified with glycerol and the triglycerides also usually contain minor amounts (usually less than one percent) of unsaturated esterified fatty acids such as oleic and elaidic acids. Advantageous partial glycerol esters are mixed glycerides, having molecular proportions falling within the above-described ranges, in which the fatty acid moiety consists of from 45 to 90 percent stearate, 50 to 5 percent palmitate, and 5 percent or less of myristates and oleates. The partial glycerol ester products, when used in the emulsifier ester compositions of this invention, are employed in amounts of up to 65 weight percent, basis the weight of the emulsifier ester composition. If more than about 65 weight percent of partial glycerol esters are employed, the surface of the confectionery product in which they are used will sometimes be tacky.

In one preferred embodiment of the emulsifier ester compositions of this invention, the compositions contain from about 15 to about 50 weight percent of an edible phospholipid of the class hereinbefore described and from about 85 to about 50 weight percent of a mixture of partial esters of sorbitol. Such compositions, when used in confectionery products, provide maximum initial surface gloss and are significantly resistant to loss of surface gloss during storage.

In another preferred embodiment of the emulsifier ester compositions of this invention, the compositions consist essentially of from about 20 to about 40 weight percent of an edible phospholipid of from about 75 to about 25 weight percent of a mixture of partial esters of glycerol and saturated aliphatic fatty acids containing from 12 to 26 carbon atoms and from about 5 to about 35 weight percent of a mixture of mono- and di-esters of sorbitol. Such compositions, when used in confectionery compositions, provide a high surface gloss in the confectionery compositions and such gloss is substantially maintained during storage.

Another aspect of this invention provides a glyceride (i.e. a hard butter) composition comprising from about 85 to about 95 weight percent of a hard butter and from about 15 to 5 weight percent of an emulsifier ester composition falling within the scope hereinbefore described. As will be hereinafter evident from the specific Examples 3 and 4, certain glyceride (i.e. hard butter) compositions falling within the scope of this invention can be prepared in situ using a ketalized sorbitol. However, the above-described hard butter compositions can also be conventionally prepared by admixing the components of these compositions.

A variety of hard butters may be employed in the glyceride (e.g. hard butter) compositions of this invention. Although there have been no recognized or accepted specifications on the chemical constitution of "hard butters," they are a broad class of triglyceride materials which possess special physical properties and performance qualities. The principal physical properties considered in a "hard butter" are its softening point, melting point, and fracture quality. Suitable "hard butters" should have a Wiley Melting Point between 84° F. and 120° F. and should be hard and brittle at around normal room temperatures; that is they should break sharply and suddenly at about 75° F., thereby having a brittle quality sometimes referred to as "snap." They should also be capable of standing at temperatures encountered in normal summer conditions without having liquid glyceride components "sweat" or bleed out to the surface in the form of droplets or a visible liquid film.

Of the numerous performance qualities of a "hard butter," an important desirable quality is the freedom from a "waxy" feeling or taste in the mouth which is related somewhat but not entirely to a narrow or sharp melting range. Other performance qualities are gauged largely by the performance of standard coatings made with the "hard butter." Coating containing desirable hard butters should set or solidify within a few minutes under normal conditions encountered in the commercial practice of enrobing or otherwise applying the coating to a candy center or food product which is to be coated. The coated product emerging from the cooling tunnel should be firm enough to permit it to be packaged. Another important performance quality is the ability of the coating, and the hard butter therein, on the enrobed product to resist any appreciable change in appearance, or character when exposed to normal summer temperatures (e.g. up to 90° F.) or at temperatures which are apt to be encountered in the transportation of the coated products.

Lauric hard butters which are suitable are prepared primarily from lauric oils such as palm kernel, coconut, tucum, babassu, etc. utilizing a variety of processes such as pressing, rearrangement, replacement, interesterification, esterification, blending and solvent fractionation. The resultant "hard butters" are triglycerides of aliphatic carboxylic acids containing between 8 and 18 carbon atoms and predominantly contain 12 carbon atoms.

Other suitable hard butters commonly referred to in the art as "domestic hard butters" are non-random triglyceride hard butters which are obtained by the solvent fractionation of hydrogenated soybean, cottonseed, peanut, rapeseed and corn oils. Domestic hard butters and processes for preparing them are described in U.S. Pat. 2,972,541. They can be blended with lauric hard butters and/or plastic fats and can be incorporated with sugar and other ingredients to provide confections having the characteristics most desired for the particular end use intended.

As previously noted, the glyceride compositions of this invention comprise from about 85 to about 95 weight percent of a hard butter and from about 15 to about 5 weight percent of the afore-defined emulsifier ester composition. Although less than about 85 weight percent of hard butter may be employed there is usually no advantage obtained and there is some possibiilty that confectionery products prepared from such hard butters will have a tacky surface due to the excessive amounts of emulsifier ester compositions employed. If more than about 95 weight percent of a hard butter is employed in the glyceride compositions, confectionery products prepared from such glyceride compositions will sometimes not have the high degree of surface gloss desired or will often lose the initial gloss upon storage. Particularly preferred glyceride compositions are those containing between about 85 and 95 percent of a hard butter and from about 5 to 15 percent of an emulsifier ester composition, since these compositions provide confectionery products having high initial surface gloss which is retained by the confectionery product during storage.

The invention also provides a confectionery composition comprising an intimate mixture of sugar, flavor and at least 25 weight percent of a glyceride composition falling within the scope of the glyceride compositions hereinbefore described. Such compositions, when prepared as hereinafter described, will have a significantly higher initial surface gloss than similar previously known confectionery compositions. The confectionery compositions need not be tempered to achieve such gloss and will not lose significant gloss during normal conditions of storage for periods of up to 3 months or longer. The reason for the high initial surface gloss which characterizes the compositions of this invention is not known with certainty but it is believed that the partial polyatomic alcohol esters, alone or in conjunction with the edible phospholipid, tend to form a surface coating which has high initial gloss. The reason for the retention of gloss during storage is also not known with certainty but it is believed to be due to the action of the edible phospholipid, sorbitol ester (and/or the partial glycerol esters when used) in the hard butter to prevent polymorphic transformation of the hard butter in the confectionery composition.

If less than about 25 weight percent of the glyceride composition is employed the confectionery compositions, while having initial gloss, will uually have an unsatisfactory consistency. Advantageous coating compositions contain from 25 to 45 percent by weight of the glyceride compositions of this invention and such compositions, whether they contain chocolate, liquor or cocoa or whether this ingredient (e.g. chocolate, liquor or cocoa) is omitted and replaced by milk solids will have and will maintain the high initial surface gloss. The confectionery composition of this invention can be used as coating or enrobing agents for candy and bakery products or can be extruded or molded to form candy bars.

Surprisingly, the emulsifier ester composition, when incorporated in the glyceride compositions and used in confections, provide products which have a high initial surface gloss and which substantially maintain the high degree of gloss during storage. Previously known hard butter emulsifier additives either do not provide the high degree of initial surface gloss in confectionery products or do not provide products in which the surface gloss is substantially maintained upon storage.

As is evident from the foregoing, the invention provides an improved process for preparing an edible confection in which a hard butter in the molten state is admixed with a sugar and flavoring agents and the resulting mixture is thereafter solidified. The improvement is for enhancing and maintaining the gloss on the surface of the hardened composition and comprises incorporating in said composition, prior to the solidification thereof, an emulsifier ester composition comprising an edible phospholipid and a partial ester of a polyatomic alcohol falling within the class of partial esters of polyatomic alcohols hereinbefore described. By so proceeding, confectionery compositions having the afore-noted gloss properties can be readily obtained. The emulsifier ester compositions of this invention can be added and mixed with the hard butter-sugar, milk solids and/or cocoa, salt and flavor mixture while the mixture is in the molten state or it can be incorporated in the hard butter prior to mixing with the sugar milk solids and/or cocoa, salt and flavor mixture to form the glyceride compositions hereinbefore described.

Whereas similar prior art confectionery products generally require a tempering step to achieve high initial gloss, such a step is not required in the process of this invention and the molten mixture comprising the emulsifier ester compositions, hard butter-sugar, milk solids and/or cocoa, salt and flavoring agents can be directly solidified to obtain a high level of initial and lasting gloss.

The following specific examples are intended to illustrate the invention but not to limit the scope thereof, parts and percentages being by weight unless otherwise specified.

EXAMPLE 1

Emulsifier ester compositions containing the ingredients and amounts listed in Table I were prepared by intimately mixing the respective ingredients.

TABLE I.—EMULSIFIER ESTER COMPOSITIONS

| | Composition number, percent | | | | | | |
|---|---|---|---|---|---|---|---|
| | 1 | 2 | 3 | 4 | 5 | 6 | 7 |
| Ingredient: | | | | | | | |
| Sorbitol-stearate | 50 | 67 | 75 | 80 | 60 | | |
| Sorbitol-palmitate | | | | | | 67 | |
| Sorbitol-behenate | | | | | | | 67 |
| Lecithin | 50 | 33 | 25 | 20 | 40 | 33 | 33 |

Compositions 1 through 7 were incorporated in a lauric hard butter (a commercial edible coating fat sold by The Glidden Company under the trademark Paramount B) by melting the hard butter and mixing the emulsifier esters therein in the amounts listed in Table II.

TABLE II.—HARD BUTTER COMPOSITIONS

| | Composition number, percent | | | | | | | | |
|---|---|---|---|---|---|---|---|---|---|
| | 8 | 9 | 10 | 11 | 12 | 13 | 14 | 15 | 16 |
| Ingredients: | | | | | | | | | |
| Composition number 1 | 2 | | | 4 | | | | | |
| Composition number 2 | | 3 | | | 6 | | | | |
| Composition number 3 | | | 4 | | | | | | |
| Composition number 4 | | | | 5 | | | | | |
| Composition number 5 | | | | | | 5 | | | |
| Composition number 6 | | | | | | | | 3 | |
| Composition number 7 | | | | | | | | | 3 |
| Lauric hard butter | 98 | 97 | 96 | 95 | 96 | 95 | 94 | 97 | 97 |

Coating fat compositions 8 through 16 were incorporated into a standard edible confectionery coating composition base and the effects on gloss were observed. The confectionery coating compositions are described in Table III.

TABLE III.—CONFECTIONERY COMPOSITIONS

| | Composition number, percent | | | | | | | | |
|---|---|---|---|---|---|---|---|---|---|
| | 17 | 18 | 19 | 20 | 21 | 22 | 23 | 24 | 25 |
| Ingredients: | | | | | | | | | |
| Composition number 8 | 33.22 | | | | | | | | |
| Composition number 9 | | 33.22 | | | | | | | |
| Composition number 10 | | | 33.22 | | | | | | |
| Composition number 11 | | | | 33.22 | | | | | |
| Composition number 12 | | | | | 33.22 | | | | |
| Composition number 13 | | | | | | 33.22 | | | |
| Composition number 14 | | | | | | | 33.22 | | |
| Composition number 15 | | | | | | | | 33.22 | |
| Composition number 16 | | | | | | | | | 33.22 |
| Sucrose | 46.71 | 46.71 | 46.71 | 46.71 | 46.71 | 46.71 | 46.71 | 46.71 | 46.71 |
| Cocoa | 19.88 | 19.88 | 19.88 | 19.88 | 19.88 | 19.88 | 19.88 | 19.88 | 19.88 |
| Salt | 0.13 | 0.13 | 0.13 | 0.13 | 0.13 | 0.13 | 0.13 | 0.13 | 0.13 |
| Vanillin | 0.06 | 0.06 | 0.06 | 0.06 | 0.06 | 0.06 | 0.06 | 0.06 | 0.06 |

Standard confection centers were coated with confectionery coating compositions 17 through 25 and the effect on initial and retained gloss was observed. The enrobed samples were initially rated shortly after emerging from the cooling tunnel in which the coatings were solidified. The enrobed samples were stored at room temperature and the gloss of these samples was rated at one and four weeks. A coating composition, consisting of lauric hard butter to which only lecithin had been added, was used as a control.

The numerical ratings of surface gloss assigned and employed in Table IV are as follows:

9, 10—Ideal to excellent
7, 8—Good
5, 6—Fair (Barely acceptable)
3, 4—Poor
2—Dull
1—Bloomed

TABLE IV.—GLOSS AND GLOSS RETENTION IN CONFECTIONERY COMPOSITIONS

| | Composition number, gloss rating | | | | | | | | |
|---|---|---|---|---|---|---|---|---|---|
| | 17 | 18 | 19 | 20 | 21 | 22 | 23 | 24 | 25 |
| Time, weeks: | | | | | | | | | |
| Initial | 5 | 9 | 9 | 9 | 9 | 9 | 9 | 9 | 8 |
| 1 | 5 | 5 | 5 | 5 | 5 | 8 | 8 | 5 | 5 |
| 4 | 5 | 5 | 5 | 5 | 5 | 8 | 8 | 5 | 5 |

As will be evident from the ratings in Table IV, composition 17 prepared from a hard butter which contained only 2 percent of the emulsifier ester composition No. 1 exhibited a barely acceptable initial gloss. The remainder of the compositions containing 3 percent or more of one of the emulsifier ester compositions of this invention exhibited good initial gloss. However, the compositions after one week of storage with the exception of compositions 22 and 23 exhibited significant loss of gloss. Compositions 22 and 23 were prepared from coating fat compositions which contain respectively 5 and 6 percent of different emulsifier compositions falling within the scope of this invention. However, compositions 18 through 25 exhibited a gloss significantly superior to the gloss obtained with conventional coating compositions and the gloss was recorded on untempered samples. The above confectionery compositions can be used as coating compositions or can be molded into bars and the like and will have a higher surface gloss and significantly better gloss retentive properties than compositions to which sorbitol ester-lecithin emulsifier compositions have not been incorporated.

When sphingomyelin or cephalin is substituted for the lecithin employed in the composition described in Table I and when these emulsifier ester compositions containing phospholipids other than lecithin are employed to make hard butter compositions which are, in turn, used in the preparation of confectionery compositions such as those described in Table III, the confectionery compositions have a high initial gloss and maintain the gloss on storage.

As will be hereinafter evident in Example 2, domestic hard butter (e.g. a hard butter sold under the trademark of Kaomel) can be substituted for lauric hard butter in the hard butter compositions described in Table II. The confectionery products prepared from such hard butter, while having a somewhat lower initial gloss but a higher gloss than standard confectionery products (prepared with domestic hard butter), substantially maintain gloss under ambient storage conditions.

EXAMPLE 2

Glycerol esters having the formulae listed below were prepared by reacting tristearin and glycerol in the presence of a low temperature rearrangement catalyst (i.e. sodium methoxide). Thin layer chromatographic analysis of the reaction products showed the character of the compositions to be that shown in Table V. Triglyceride stearin is a domestic triglyceride fat containing preponderantly glycerol tristearate but which also contains minor amounts (i.e. about 10 percent) of glycerol palmitates.

TABLE V.—PARTIAL ESTERS OF GLYCEROL

| | Composition number, percent | | | | |
|---|---|---|---|---|---|
| | 26 | 27 | 28 | 29 | 30 |
| Ingredient: | | | | | |
| Triglyceride | 12.8 | 25.1 | 38.5 | 37.5 | 43.4 |
| Diglyceride | 21.1 | 31.8 | 27.1 | 19.2 | 24.7 |
| Monoglyceride | 66.1 | 43.1 | 34.4 | 43.2 | 31.8 |

Emulsifier ester compositions, containing the partial glycerol esters above-described, lecithin and sorbitol stearate in the amounts listed in Table VI were prepared by mixing the ingredients in the proportions listed in Table VI.

TABLE VI.—EMULSIFIER ESTER COMPOSITIONS

| | Composition number, percent | | | | |
|---|---|---|---|---|---|
| | 31 | 32 | 33 | 34 | 35 |
| Ingredient: | | | | | |
| Composition number 26 | 37.8 | | | | |
| Composition number 27 | | 44.7 | | | |
| Composition number 28 | | | 53.8 | | |
| Composition number 29 | | | | 62.3 | |
| Composition number 30 | | | | | 55.4 |
| Lecithin | 33.3 | 37.4 | 24.7 | 28.5 | 24.7 |
| Sorbitol-stearate | 28.9 | 17.9 | 21.5 | 9.2 | 19.9 |

Coating fat compositions containing the emulsifier ester compositions shown in Table VII and lauric and domestic hard butters were prepared using the specific emulsifier ester compositions and hard butters set forth in Table VII.

TABLE VII.—HARD BUTTER COMPOSITIONS

| | Composition number, percent | | | | |
|---|---|---|---|---|---|
| | 36 | 37 | 38 | 39 | 40 |
| Ingredient: | | | | | |
| Composition number 31 | 6.01 | | | | |
| Composition number 32 | | 5.35 | | | |
| Composition number 33 | | | 8.10 | | |
| Composition number 34 | | | | 7.02 | |
| Composition number 35 | | | | | 8.10 |
| Lauric hard butter | 93.99 | 94.65 | 91.90 | | |
| Domestic hard butter | | | | 92.98 | 91.90 |

The hard butter compositions were then incorporated in confectionery base compositions using the procedure employed in Example 1. The confectionery compositions were evaluated for gloss in accordance with the procedure of that example. The results are tabulated in Table VIII and are compared with control compositions which contained lecithin but which did not contain sorbitol esters or glycerol partial esters.

TABLE VIII.—GLOSS AND GLOSS RETENTION IN CONFECTIONERY COMPOSITIONS MADE WITH COATING FAT COMPOSITIONS 31 THROUGH 35

| | Composition number, gloss rating, percent | | | | | Controls | |
|---|---|---|---|---|---|---|---|
| | 36 | 37 | 38 | 39 | 40 | A [1] | B [2] |
| Time, weeks: | | | | | | | |
| Initial | 8.9 | 8.6 | 9.0 | 5.8 | 6.7 | 4.6 | 4.5 |
| 1 | 9.0 | 8.5 | 8.9 | 6.1 | 5.4 | 2.5 | 4.1 |
| 2 | 8.9 | 8.6 | 8.8 | 5.9 | 6.2 | 2.0 | 4.6 |
| 3 | 8.6 | 8.5 | 8.8 | 6.9 | 6.2 | 2.0 | 3.0 |
| 4 | 8.4 | 8.5 | 8.6 | 6.3 | 6.4 | 2.0 | 2.9 |
| 5 | 8.2 | 8.6 | 8.5 | 5.4 | 6.1 | 2.0 | 2.9 |
| 6 | 8.2 | 8.2 | 8.3 | 5.6 | 5.8 | 2.0 | 2.9 |
| 7 | 8.0 | 8.0 | 8.3 | 5.5 | 5.8 | 2.0 | 2.9 |
| 8 | 8.0 | 8.0 | 8.3 | 6.4 | 6.5 | 2.0 | 2.9 |
| 12 | 8.3 | 7.5 | 8.0 | 6.4 | 6.5 | 2.0 | 2.9 |

[1] Lauric hard butter containing 2 percent lecithin only.
[2] Domestic hard butter containing 2 percent lecithin only.

Confectionery compositions 36 through 38 containing the lauric hard butter fat-emulsifier compositions had high initial gloss and substantially retained their gloss over the 12 week observation period. Compositions 39 and 40 which contained the domestic hard butter had lower initial gloss (albeit higher than the control) and substantially retained the surface gloss on storage. Control samples in every instance had lower initial gloss and exhibited a marked loss of (initially lower) gloss during storage.

When sphingomyelin or cephalin is substituted for the lecithin employed in the compositions described in Table VI and when these emulsifier ester compositions containing phospholipids other than lecithin are employed to make hard butter compositions which are, in turn, used in the preparation of hard butter compositions such as those described in Table VII, confectionery compositions prepared therefrom have a high initial gloss and maintain the gloss on storage.

EXAMPLE 3

Sorbitol di-isopropylidine-3-mono-stearate, prepared from sorbitol (36.4 grams), acetone, sodium stearate (3.06 grams) and stearic acid (55.8 grams) was melted by heating to a temperature of 80° C. and 62.5 grams of glycerolyzed tri-stearin (the reaction product of glycerol and tri-stearin in the presence of a sodium methoxide rearrangement catalyst) was added thereto to form a solution comprising sorbitol di-isopropylidine-3-mono-stearate dissolved in glycerolyzed stearin. To this solution there was added 130 ml. of distilled water which had been heated to 90° C. and 53 milliliters of a 10:1 aqueous solution of HCl which was also at 90° C. The resulting double phase mixture was stirred vigorously at between 79–81° C. for ½ hour and thereafter, while gentle stirring was continued, the solution cooled to 60° C. The aqueous layer was removed by decantation and 150 milliliters of hot water (80° C.) was added which was stirred and removed by decantation. The resulting product consisted of 124.47 grams of a light brown amorphous solid which, upon analysis, was found to consist of 29 percent sorbitol-3-mono-stearate and 60 percent of glycerol esters and 11 percent free fatty acids. To 11.0 grams of this product, 6.6 grams of lecithin were added and mechanically mixed therein to provide an emulsifier mixture similar to those described in Examples 1 and 2. This emulsifier ester mixture was incorporated in lauric hard butter in an amount of 5.35 percent by weight. When the resulting hard butter composition was used to prepare a confection as described in Example 2, the resultant product had an initial surface gloss rating of 8.6 and after 3 months had a surface gloss rating of 7.5 indicating that substantially all of the initial gloss had been retained. Confection products containing lecithin but which did not contain sorbitol esters had an initial surface gloss rating of 4.6 and this decreased in 12 weeks to a gloss rating of 2.0. When sorbitol esters are added and the lecithin is omitted, the initial gloss is about the same as the sorbitol ester-free (but lecithin containing) confection.

EXAMPLE 4

Ninety-one (91) grams (0.5 mole) of sorbitol were suspended in 500 ml. acetone and 1.3 ml. of concentrated HCl was added to the suspension. The mixture was stirred at room temperature for 2 hours after which time the suspension had become clear indicating that the sorbitol had been converted to the acetone soluble ketal (i.e. sorbitol di-isopropylidine). Sodium hydroxide (1.1 gram—$2.75 \times 10^{-2}$ mole) was added to the solution to neutralize the acid (thereby quenching further reaction between the sorbitol and the acetone) and the solution was stirred at room temperature for 30 minutes. A reaction product consisting of crude sorbitol di-isopropylidine dissolved in acetone which also contained small quantities of water, sodium chloride, sodium hydroxide, sorbitol mono-isopropylidine and sorbitol tri-isopropylidine was obtained.

The acetone and water were removed from the reaction product by distillation under partial vacuum (i.e. an aspirator) at a temperature of about 100° C. and 147 grams (0.167 mole) of soybean stearine (a hydrogenated soybean oil in which the fatty acid ester content consisted of approximately 90 percent stearate and 10 percent palmitate) were added and mixed with the hot (100° C.) crude sorbitol di-isopropylidine. The mixture, which initially consisted of sorbitol di-isopropylidine dissolved in stearine, was heated to 180° C. with mechanical stirring for 4 hours after which time it was permitted to cool to room temperature over a 12 hour period. During the cooling two layers formed: a white solid upper layer which consisted preponderantly of the fatty acid mono-ester of sorbitol di-isopropylidine (e.g. sorbitol di-isopropylidine-3-mono-stearate) and a dark viscous lower layer consisting preponderantly of glycerine.

The two layers were heated to 60° C. to melt the white layer and the melted liquid of the white layer was separated from the viscous lower layer by decantation. One hundred (100) grams of a lauric hard butter (a product sold commercially under the trademark of Paramount B) were added to the decanted white product while it was maintained in a liquid state at a temperature of 60° C. To this mixture there was added 100 ml. of a three percent aqueous solution of hydrochloric acid which had been pre-heated to 60° C. There was thus formed a two-phase aqueous and fatty mixture which was stirred for 30 minutes while the temperature of the mixture was maintained at between 65 and 75° C. Thereafter, a 50 ml. quantity of warm water (60° C.) was added while gentle agitation was continued and two layers, a water layer and an oily layer, formed and separated and the water was removed by decantation. The resulting oily layer was a product which consisted preponderantly of the fatty acid mono-ester of sorbitol, the ketal (i.e. isopropylidine) groups having been removed from the sorbitol by acid hydrolysis during the contact of the aqueous acid and the lauric hard butter-ketalized sorbitol ester mixture. The product was then washed with warm water using 5 separate 100 ml. increments of warm water and the steps of stirring and decantation of the water were repeated. The washed product was dried by heating it to a temperature of 100° C. at atmospheric pressure. A yield of 268.3 grams of a product which contained 77.5 grams of sorbitol ester (substantially sorbitol-3-mono-stearate and glycerides) was obtained.

The product was analyzed by column chromatography and found to disperse into four fractions in the silica chromatographic column. The first fraction, which accounted for 40.2 percent of the product, consisted predominantly of hard butter triglycerides and contained minor amounts of free fatty acid. The second fraction, which accounted for 15.8 percent of the product, contained preponderant amounts of diglycerides and small amounts of free fatty acids. The third fraction, which accounted for 17.5 percent of the original product, consisted substantially of mono-glycerides and trace amounts of sorbitol esters. The fourth fraction, which accounted for 28.8 percent of the product, consisted predominantly of the mono fatty acid ester of sorbitol.

To 9.2 grams of this product, 6.6 grams of lecithin were added and the two components were mixed. The resulting product was an emulsifier ester composition and when 15.8 grams of this composition were mixed with 330 grams of lauric hard butter and the resulting mixture was employed in an amount of 34.6 percent with a powdered mixture of sucrose, cocoa, salt and vanillin to provide a confectionery composition similar to those described in Table III, the confectionery had an initial gloss of 9.1 and a gloss after 8 weeks of storage of 7.5.

If desired, cocoa butter may be used in place of or as a partial replacement for lauric and domestic hard butters in the glyceride compositions and confectionery products of this invention.

What is claimed is:

1. An emulsifier composition consisting essentially of from about 20 to about 40 weight percent of an edible phospholipid, from about 75 to about 25 weight percent of a mixture of partial esters of glycerol and saturated aliphatic fatty acids containing from 12 to 26 carbon atoms, and from about 5 to about 35 weight percent of a mixture of mono- and di-esters of sorbitol.

2. The composition of claim 1 wherein the mixture of partial esters of glycerol and saturated fatty acids is the reaction product of glycerol and triglyceride, said mixture containing from about 10 to about 45 weight percent triglyceride, from about 15 to about 35 weight percent of diglyceride and from about 75 to about 20 weight percent of mono-glyceride.

3. The composition of claim 1 wherein the mixture of partial esters of glycerol consists of tri-stearin, di-stearin and mono-stearin.

References Cited
UNITED STATES PATENTS

| | | | |
|---|---|---|---|
| 2,997,493 | 8/1961 | Huber | 260—410.6 |
| 3,199,984 | 8/1965 | Jensen et al. | 99—23 |
| 3,270,040 | 8/1966 | Bradshaw et al. | 260—410.7 |
| 3,360,378 | 12/1967 | Spitzer et al. | 99—123 |

FOREIGN PATENTS

| | | | |
|---|---|---|---|
| 832,343 | 4/1960 | Great Britain | 99—23 |

JOSEPH M. GOLIAN, Primary Examiner

U.S. Cl. X.R.

99—15, 23, 134